United States Patent
Kumar

(10) Patent No.: US 11,681,942 B2
(45) Date of Patent: Jun. 20, 2023

(54) PROVIDING INTELLIGENT FILE NAME SUGGESTIONS

(71) Applicant: DROPBOX, INC., San Francisco, CA (US)

(72) Inventor: Neeraj Kumar, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 488 days.

(21) Appl. No.: 15/336,358

(22) Filed: Oct. 27, 2016

(65) Prior Publication Data
US 2018/0121825 A1    May 3, 2018

(51) Int. Cl.
*G06N 20/00* (2019.01)
*G06F 3/0482* (2013.01)
*G06F 40/56* (2020.01)

(52) U.S. Cl.
CPC ........... *G06N 20/00* (2019.01); *G06F 3/0482* (2013.01); *G06F 40/56* (2020.01)

(58) Field of Classification Search
CPC ...... G06N 20/00; G06N 5/047; G06F 3/0482; G06F 17/2881; G06F 40/56
See application file for complete search history.

(56) References Cited

U.S. PATENT DOCUMENTS

| | | |
|---|---|---|
| 6,590,608 B2 | 7/2003 | Matsumoto et al. |
| 6,751,614 B1 | 6/2004 | Rao |
| 6,993,517 B2 | 1/2006 | Naito et al. |
| 7,028,250 B2 | 4/2006 | Ukrainczyk et al. |
| 7,039,856 B2 | 5/2006 | Peairs et al. |
| 7,043,492 B1 | 5/2006 | Neal et al. |
| 7,076,527 B2 | 7/2006 | Bellegarda et al. |
| 7,440,944 B2 | 10/2008 | Selvaraj et al. |
| 7,533,093 B2 | 5/2009 | Gutta et al. |
| 7,739,304 B2 | 6/2010 | Naaman et al. |

(Continued)

FOREIGN PATENT DOCUMENTS

| | | |
|---|---|---|
| WO | WO 2009094661 A1 | 7/2009 |
| WO | WO 2009117607 A1 | 9/2009 |

OTHER PUBLICATIONS

AMacxd, "Batch Rename .MKV Files Using Tags Free on Mac." YouTube, uploaded by aMacxd, Nov. 29, 2012, www.youtube.com/watch?v=EsWqp4f7cmA. (Year: 2012).*

(Continued)

*Primary Examiner* — Li B. Zhen
*Assistant Examiner* — Henry Nguyen
(74) *Attorney, Agent, or Firm* — Keller Preece PLLC

(57) ABSTRACT

One or more embodiments of a content naming system provide machine-learned name suggestions to a user for naming content items. Specifically, an online content management system can train a machine-learning model to identify a naming pattern from previously stored content items corresponding to a user account of the user. The online content management system uses the machine-learning model to determine a plurality of name suggestions for naming a content item associated with the user account. One or more embodiments provide graphical elements corresponding to the name suggestions within a graphical user interface. The user can select one or more graphical elements to add the corresponding name suggestion(s) to the name of the content item.

20 Claims, 7 Drawing Sheets

(56) References Cited

U.S. PATENT DOCUMENTS

| | | |
|---|---|---|
| 7,849,141 B1 | 12/2010 | Bellegarda et al. |
| 7,949,660 B2 | 5/2011 | Green et al. |
| 8,108,204 B2 | 1/2012 | Gabrilovich et al. |
| 8,572,084 B2 | 10/2013 | Knight et al. |
| 8,635,223 B2 | 1/2014 | Knight |
| 8,793,573 B2 | 7/2014 | Beckmann et al. |
| 8,856,161 B2 | 10/2014 | Balakrishnan et al. |
| 8,886,576 B1* | 11/2014 | Sanketi .................... G06K 9/00 706/12 |
| 8,990,688 B2 | 3/2015 | Lee et al. |
| 9,008,438 B2 | 4/2015 | Kawanishi et al. |
| 9,065,794 B2 | 6/2015 | Smith et al. |
| 9,069,845 B2 | 6/2015 | Oliver et al. |
| 9,152,723 B2 | 10/2015 | Lee et al. |
| 9,235,752 B2 | 1/2016 | Eaton et al. |
| 9,251,508 B2 | 2/2016 | Bishop |
| 9,380,086 B2 | 6/2016 | Baccichet et al. |
| 9,384,226 B1 | 7/2016 | Goel et al. |
| 9,424,529 B2 | 8/2016 | Agrawal et al. |
| 9,448,704 B1 | 9/2016 | Belhumeur et al. |
| 9,471,581 B1* | 10/2016 | Lee ...................... G06F 3/0482 |
| 9,477,673 B2 | 10/2016 | Dwan et al. |
| 9,483,741 B2 | 11/2016 | Sun et al. |
| 9,501,762 B2 | 11/2016 | Babenko et al. |
| 9,547,712 B2 | 1/2017 | Kraley |
| 9,558,401 B2 | 1/2017 | Chajed et al. |
| 9,805,042 B1 | 10/2017 | Meyer |
| 9,852,377 B1 | 12/2017 | Kumar |
| 10,762,439 B2 | 9/2020 | Cao et al. |
| 2001/0042085 A1 | 11/2001 | Peairs et al. |
| 2002/0022956 A1 | 2/2002 | Ukrainczyk et al. |
| 2007/0027911 A1 | 2/2007 | Hakala et al. |
| 2008/0298766 A1 | 12/2008 | Wen et al. |
| 2009/0012991 A1* | 1/2009 | Johnson ............ G06F 16/24573 |
| 2009/0119324 A1* | 5/2009 | Simard .................. G06F 16/93 |
| 2009/0163183 A1 | 6/2009 | O'Donoghue et al. |
| 2009/0265631 A1* | 10/2009 | Sigurbjornsson ...... G06Q 10/10 715/716 |
| 2009/0327168 A1 | 12/2009 | Weinberger et al. |
| 2010/0274750 A1 | 10/2010 | Oltean et al. |
| 2011/0125783 A1 | 5/2011 | Whale et al. |
| 2011/0243461 A1 | 10/2011 | Nayar et al. |
| 2011/0264528 A1 | 10/2011 | Whale |
| 2014/0181157 A1 | 6/2014 | Houston et al. |
| 2014/0201180 A1* | 7/2014 | Fatourechi .......... G06F 16/2453 707/706 |
| 2014/0280188 A1* | 9/2014 | Seiwald .............. G06F 16/2228 707/741 |
| 2014/0330836 A1 | 11/2014 | Parashar |
| 2015/0081690 A1* | 3/2015 | Arom ...................... G06F 16/68 707/728 |
| 2016/0026720 A1* | 1/2016 | Lehrer ................. G06Q 10/101 707/710 |
| 2016/0092730 A1 | 3/2016 | Smirnov |
| 2016/0212298 A1* | 7/2016 | Hama .................. G06K 9/2081 |
| 2016/0239900 A1 | 8/2016 | Kamdar et al. |
| 2016/0247080 A1 | 8/2016 | Trantham et al. |
| 2017/0109136 A1* | 4/2017 | Colle .................... G06F 3/0482 |
| 2017/0154282 A1 | 6/2017 | Rossi et al. |
| 2018/0129950 A1 | 5/2018 | Kumar |

OTHER PUBLICATIONS

U.S. Appl. No. 15/348,616, Aug. 11, 2017, Notice of Allowance.
U.S. Appl. No. 15/348,616, Feb. 10, 2017, Office Action.
U.S. Appl. No. 15/814,642, Aug. 22, 2019, Office Action.
Non-Final Office Action from U.S. Appl. No. 15/814,642, dated Mar. 5, 2020, 13 pages.
Office Action for U.S. Appl. No. 15/336,358 dated May 29, 2019, 36 pages.
ExcalTech., "5 Easy Ways to Move Several Files at Once in Windows," Jul. 21, 2016, retrieved from https://www.excaltech.com/5-easy-ways-move-files-windows, pp. 1.
Final Office Action from U.S. Appl. No. 15/814,642, dated Sep. 21, 2020, 13 pages.
Kishore A., "How to Automatically Move in Windows", Oct. 11, 2014, pp. 1-6.
Notice of Allowance from U.S. Appl. No. 15/814,642, dated Apr. 2, 2021, 5 pages.
Non-Final Office Action from U.S. Appl. No. 17/355,563, dated Jan. 20, 2023, 17 pages.

* cited by examiner

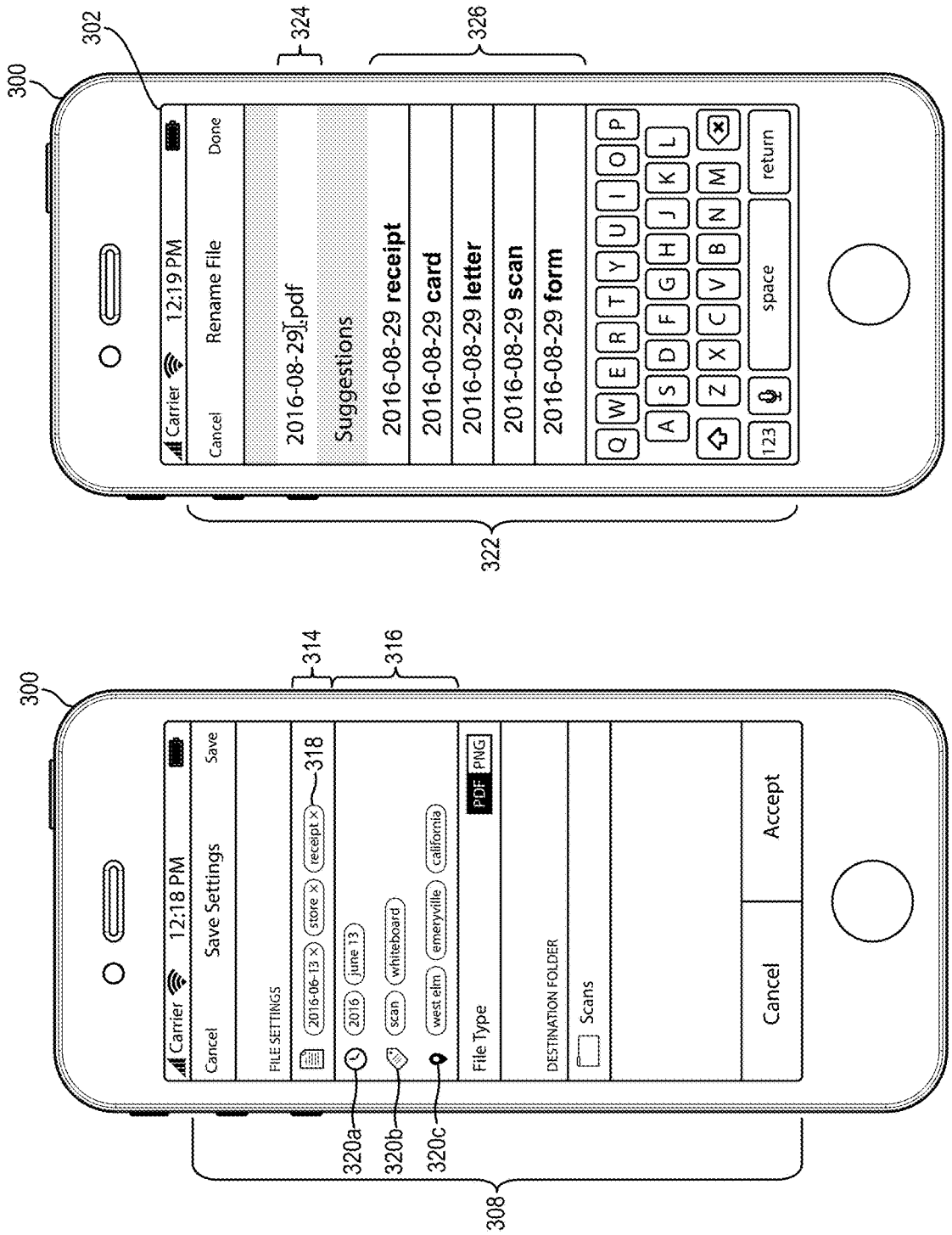

PROVIDING INTELLIGENT FILE NAME SUGGESTIONS

BACKGROUND

When storing digital content items on a client device, naming the content items can be an important part of organizing the content items on the client device. Unique and/or descriptive names allow users to more effectively navigate and find content items, particularly when many content items are stored on a client device. For example, naming a content item with a unique name can allow users to quickly distinguish the content item from other content items. Additionally, naming a content item with a descriptive name allows the user to quickly determine one or more characteristics of the content item (e.g., contents of the content item, timestamp). Accordingly, users often use particular naming conventions or follow certain tendencies to help the user organize content items for later retrieval.

Some conventional naming systems automatically name content items using various automatic naming conventions. To illustrate, some conventional naming systems use randomly generated strings or other automatically generated, generic names (e.g., using a date and timestamp) to name the content items. As such, a user can quickly name the content items by accepting the automatically generated names without having to manually type in a name for each content item. However, these conventional naming systems often create names that are not intuitive and/or that are too generic, thereby resulting in difficulty when the user attempts to find the content items at a later time. To illustrate, if all files are named based on the date/time at which the user saves the files, the user may be unable to easily find a specific file among multiple files saved or created around the same date/time.

Some conventional naming systems attempt to overcome the limitations of generically named content items by identifying unique characteristics of the content items. For example, some conventional systems analyze a text document to identify a string of characters (e.g., a word or phrase) at the beginning of the text document and provide the string of characters to a user for naming the text document. While such systems suggest a descriptive name based on content within the content item, such systems are limited to specific types of content items (e.g., text documents), and unduly rely on the assumption that the first words within the properly describe the content item relative to other content items. Furthermore, such systems ignore how naming preferences vary from one user to another. Accordingly, a number of disadvantages are present with regard to conventional systems used to name content items.

SUMMARY

One or more embodiments described herein provide benefits and/or solve one or more of the foregoing or other problems in the art with systems and methods for naming content items. In particular, the systems and methods described herein provide machine-learned filename suggestions for naming content items based on previously named content items. For example, the systems and methods train a machine-learning model based on previously named content items associated with a user or a particular plurality of users (e.g., a group of co-workers) to allow the model to learn naming conventions and patterns specific to the user or user group and provide suggestions to a user based on the learned naming patterns. Specifically, one or more embodiments determine characteristics of a content item to be named. The systems and methods use the machine-learning model to determine suggestions based on naming patterns for other content items having similar characteristics as the content item.

The systems and methods then provide suggestions for naming the content item within a graphical user interface. In particular, one or more embodiments generate graphical elements with the corresponding machine-learned suggestions and provide the graphical elements in the graphical user interface. This allows user selection of one or more of the graphical elements to add to the name of the content item using the corresponding name suggestions. For example, the disclosed systems and methods identify one or more selected graphical elements and apply the corresponding name suggestions to the name of the content item in an order in which the graphical elements are selected. The systems and methods can further update the machine-learning model based on the resulting name of the content item to continue learning naming patterns for the user.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

FIGS. 3A-3D illustrate example graphical user interfaces for naming and saving a digital content item in accordance with one or more embodiments;

DETAILED DESCRIPTION

Figure 1:
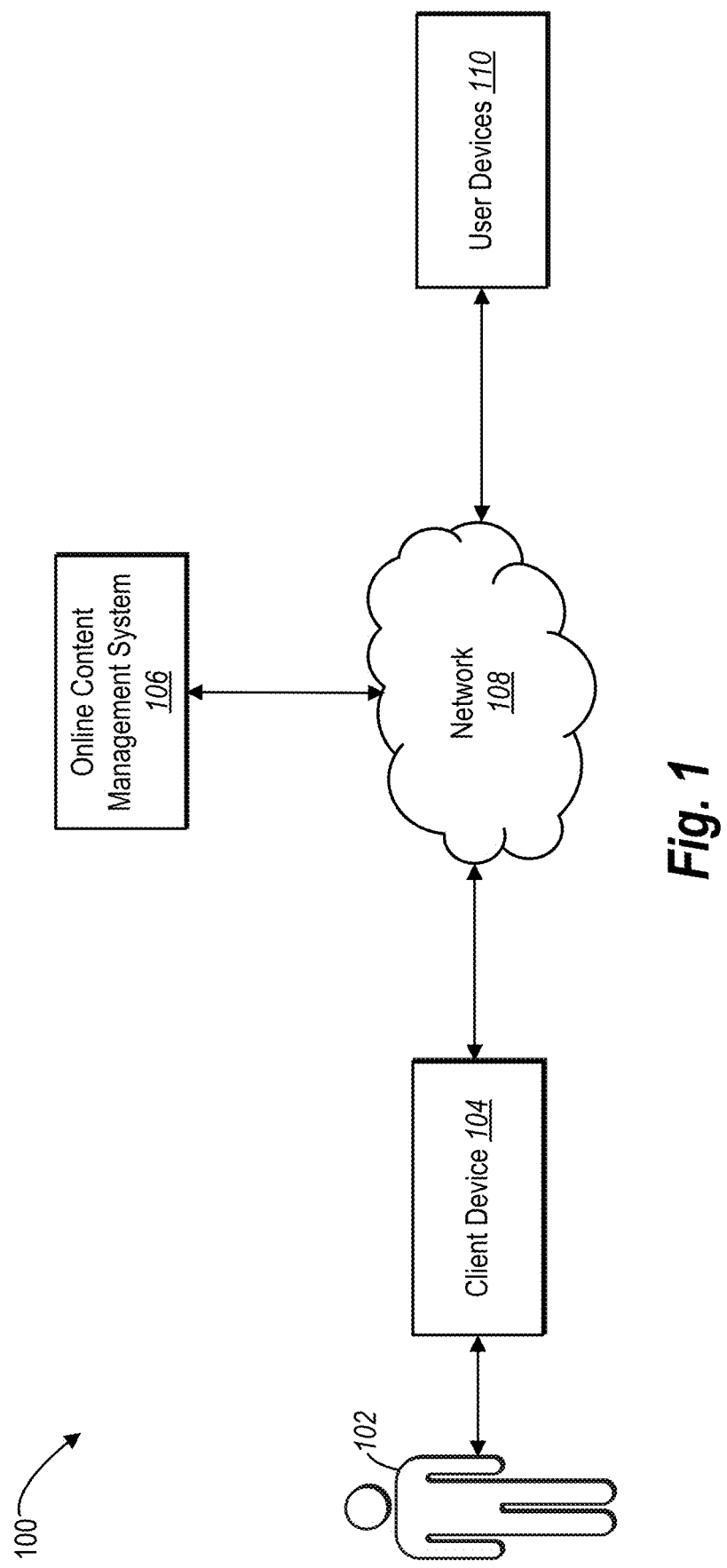
FIG. 1 illustrates a schematic diagram of an environment in which a naming system operates in accordance with one or more embodiments.

Embodiments of the present disclosure provide a naming system that provides name suggestions for content items. In particular, the naming system provides name suggestions in response to identifying a request to name a content item. For example, when storing a content item (e.g., a text document, image file, video file) on a client device or on a remote storage device, the naming system uses a machine-learning model to determine one or more name suggestions for the content item. In particular, the naming system uses the machine-learning model to identify a naming pattern based on previously named content items. The naming system then provides name suggestions that are consistent with the identified naming pattern. Thus, the naming system provides a way for a user to name a content item consistently with other content items that the user has previously stored and in a manner that allows the user to easily distinguish the content items from one another.

In one or more embodiments, the naming system trains the machine-learning model using a plurality of content items associated with a user account for a user. Specifically, the naming system accesses naming information for a plurality of content items that the user has previously named. The naming system identifies characteristics of the previously named content items and naming patterns that indicate relationships between the characteristics of the content items and the names of the content items. Based on the naming patterns, the naming system trains the machine-learning model to identify characteristics that the user indicates or emphasizes when naming content items that are similar to the content item the user is currently naming.

The naming system can also train the machine-learning model using a plurality of content items associated with a plurality of user accounts. For example, the naming system can train the machine-learning model to use content items from a specific group of users. The naming system trains the machine-learning model to recognize naming patterns associated with all of the users in the group. The naming system can then use the machine-learning model to provide suggestions to the group of users based on the naming patterns associated with the users in the group. In at least some embodiments, the group includes any users that have user accounts with the naming system, thereby allowing the naming system to provide suggestions based on general naming trends across a large group of users. Other embodiments include a group of users with predetermined relationships, such as employees of a business.

To provide name suggestions to a user, the naming system identifies a request to name a content item. Specifically, in response to a request to name a content item when the user attempts to store the content item to a storage device (e.g., on the user's client device), the naming system determines characteristics of the content item. Based on the determined characteristics, the naming system applies the machine-learning model to the content item to generate name suggestions for naming the content item. As such, the naming system provides name suggestions that are consistent with other content items having the same or similar characteristics.

Additionally, the naming system provides graphical elements corresponding to the name suggestions for display on a display device of the user's client device. In particular, the naming system generates a plurality of graphical elements, such as selectable icons or tags, that include information associated with the corresponding name suggestions. For example, the naming system can cause the user's client device to display the graphical elements in a graphical user interface. The user then can select one or more of the displayed graphical elements to name the content item according to the corresponding name suggestions. Additionally, the naming system can use the selected name for the content item to update the machine-learning model.

As mentioned, the naming system described herein provides advantages over conventional naming systems. The naming system trains a machine-learning model to provide name suggestions to users for naming digital content items based on naming patterns associated with the user or a plurality of users. As such, the naming system allows users to more quickly name content items consistently with other content items and in accordance with identified naming preferences and conventions specific to a user or group of users. By providing suggestions to the user to name content items consistently with a learned naming pattern, the user can store the content items on a storage device in a way that allows the user to more easily find a specific content item, which can be especially advantageous when the storage device includes many content items for the user.

Additionally, the naming system provides naming suggestions within a graphical user interface based on the machine-learning model. For example, the naming system can display the graphical elements representing name suggestions based on scores associated with the name suggestions. Thus, the naming system uses the machine-learning model to provide the name suggestions that the user will most likely use. Additionally, the naming system can intelligently learn different categories and present the name suggestions within different categories based on the scores of the name suggestions. Thus, the naming system provides the user with name suggestions in a user-friendly interface that updates graphical elements based on the learned naming pattern.

FIG. 1 is a schematic diagram illustrating an environment for a digital content naming system (or simply "naming system") 100 to facilitate intelligent and efficient naming of content items. An overview of the environment is described in relation to FIG. 1. Thereafter, a more detailed description of the components and processes of naming system 100 and other components within the environment are provided in relation to the remaining figures. As used herein, the term "content item" refers to a digital file, folder, or document on a computing device. For example, a content item can include a text document, video file, audio file, digital image, or other media file that stores digital content. Additionally, a content item can include a folder or other file structure element. Thus, naming system 100 can aid the user in naming files or folders for creating a consistent and easily navigable file system.

As illustrated by FIG. 1, naming system 100 allows user 102 to use client device 104 to communicate with online content management system 106 via network 108. Specifically, the client device 104 to communicate with online content management system 106 to store content items on online content management system 106. For example, user 102 can have a registered user account with the online content management system 106 for storing content items and making the content items available to user 102 through one or more client devices associated with the user account. As used herein, the term "name suggestion" refers to a suggestion to name a content item. A name suggestion can include a name segment that is intended to be part of a larger name of a content item. A name suggestion can alternatively include a name segment that is intended to be the full name of a content item. As described herein, naming system 100 provides name suggestions to a user in the form of graphical elements (e.g., icons or tags) with which the user can interact within a graphical user interface. In one or more additional embodiments, naming system 100 allows the user to select one or more name suggestions for assigning tags or categories to content items, for example, for organizing the content items.

As further illustrated in FIG. 1, and as described in more detail in additional figures, naming system 100 allows online content management system 106 to manage the user account for user 102. In particular, online content management system 106 can communicate with client device 104 to obtain information for the user account and maintain content items associated with the user account. Online content management system 106 uses information about the user account and the content items to provide name suggestions to client device 104 in response to requests by user 102 to store/name content items. The user account can be an account that the user establishes with online content management system 106 to store content items on a remote storage device (e.g., remote server devices). The user account can include identification information about the user, as well as information about the content items.

Although FIG. 1 illustrates a particular arrangement of client device 104, online content management system 106, and network 108, various additional arrangements are possible. For example, client device 104 can communicate directly with online content management system 106, bypassing network 108. In another embodiment, naming system 100 implements one or more operations of online content management system 106 partially or entirely on client device 104. To illustrate, naming system 100 can analyze content stored at client device 104 and provide suggestions to a user of client device 104 when the user requests to store another content item at the client device. Thus, naming system 100 can implement some or all operations associated with providing name suggestions on a client device, a separate server device, and/or a plurality of devices including the client device and the server device.

As briefly mentioned previously, naming system 100 provides name suggestions for naming content items. FIG. 1 illustrates that user 102 can use client device 104 to store content items on online content management system 106. In particular, naming system 100 allows first user 102 to use client device 104 to communicate with online content management system 106 via network 108 to store content items using an online storage system, such as a cloud-based storage system. Naming system 100 can also allow other users to use other client devices to communicate with online content management system 106 via network 108 to store content items using the online storage system.

Online content management system 106 communicates with client device 104 to obtain naming information and user account information associated with user 102. For example, user 102 registers a user account with online content management system 106. The user account can provide user 102 with access to one or more services associated with online content management system 106, such as online content storage. In connection with the user account, user 102 can upload or otherwise transfer content items from client device 104 to online content management system 106 to store the content items and make the content items available to user 102 from one or more client devices.

In one or more embodiments, online content management system 106 collects and maintains content item data (e.g., naming information, characteristics of content items) from a plurality of client devices such as client device 104 to train a machine-learning model. As used herein, the term "machine-learning model" can include one or more algorithms capable of learning how a user has interacted with (e.g., named) previously stored content items and outputs name suggestions for naming future content items. In particular, online content management system 106 trains the machine-learning model using a plurality of content items associated the user account of user 102. Online content management system 106 can then use the machine-learning model to provide name suggestions to user 102 when user 102 requests to name a content item.

Alternatively, online content management system 106 can use information from user accounts for a plurality of users associated with user devices 110 to provide name suggestions to any of the plurality of users. For example, the users can include a plurality of users that may be associated with each other in some way (e.g., friends, family, co-workers, or people sharing the same language or location) or may not be specifically associated with each other beyond having user accounts with online content management system 106. Additionally, user 102 may or may not be part of a group including the plurality of users. Online content management system 106 can also train different machine-learning models for different groups of users, such that online content management system 106 can use a first machine-learning model for a first user or group of users and a second machine-learning model for a second user or group of users.

According to one or more embodiments, client device 104 includes a computing device that allows user 102 to interact with content items. For example, client device 104 can include a desktop computing device or a handheld computing device. To illustrate, client device 104 allows user 102 to capture, create, modify, and/or store content items to one or more storage devices on client device 104 and/or on online content management system 106. Additionally, client device 104 can include software that allows user 102 to name content items according to content item naming processes described herein. Examples of such computing devices are described in more detail below with respect to FIG. 6.

In one or more embodiments, online content management system 106 includes one or more computing devices in communication with each other and with client device 104 via network 108. In particular, online content management system 106 can include one or more server devices that perform processes for storing content items and providing name suggestion services for users with user accounts. Thus, online content management system 106 can include or be part of a cloud-based storage system or other distributed storage environment. Alternatively, online content management system 106 can include a single computing device.

Figure 2:
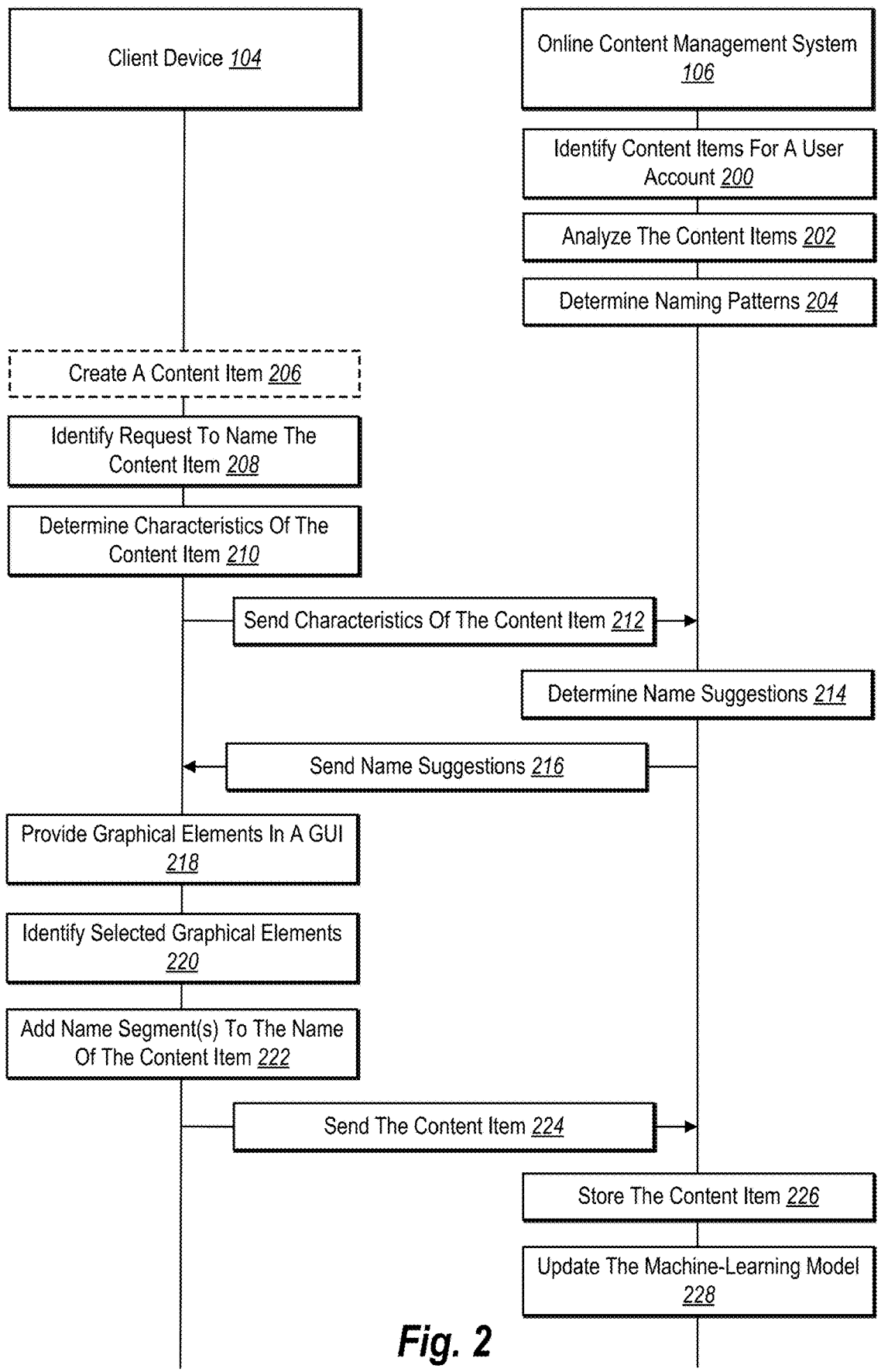
FIG. 2 illustrates a sequence-flow diagram illustrating interactions as part of a filename suggestion process in accordance with one or more embodiments.

As discussed, the systems and components explained above with reference to FIG. 1 allow users to store content items and receive machine-learned suggestions for naming the content items. FIG. 2 illustrates example process diagrams of one or more example embodiments of processes implemented by naming system 100 discussed above. Consistent with naming system 100 illustrated in FIG. 1, FIG. 2 illustrates (according to a sequence flow of operations) client device 104 and online content management system 106.

In one or more embodiments, a process for providing name suggestions for naming a content item begins with online content management system 106 training a machine-learning model to identify a naming pattern. As used herein, the term "naming pattern" refers to a trend or history that describes how a user or users name content items. In particular, a naming pattern can identify names, naming conventions, name segments, and other naming usages that indicate how the user or users typically name content items. For example, naming patterns can indicate usage of words, word types, orders of words, abbreviations, alphanumerical values, special characters, capitalization of letters, organization of characters, or other methods of naming content items for identifying or distinguishing the content items. In one or more embodiments, a naming pattern includes positions of name suggestions or of categories of name suggestions in a filename (e.g., relative to other name suggestions or to other categories of name suggestions in the same filename). Online content management system 106 can also train the machine-learning model based on the number of times a user has typed/tapped/selected a specific name suggestion or category of name suggestion. Additionally, a naming pattern can shift over time if users change how they name content items.

As FIG. 2 illustrates, training the machine-learning model includes online content management system 106 identifying content items for a user account 200. For example, online content management system 106 can identify content items that a user has previously stored in a storage device on online content management system 106. To illustrate, online content management system 106 maintains a user account for a user to allow the user to upload and store content items at the storage device of online content management system 106.

In one or more embodiments, online content management system 106 identifies content items for a plurality of user accounts associated with a plurality of users. For example, online content management system 106 can access a plurality of user accounts for a plurality of related users (e.g., users who are employees of a single company). Alternatively, online content management system 106 can access all user accounts associated with the storage device. Thus, online content management system 106 can use content items from any number of user accounts to train the machine-learning model to provide generalized machine learning or specialized machine learning, as may serve a particular embodiment.

In one or more embodiments, online content management system 106 also determines one or more characteristics of the content items. For example, online content management system 106 can identify a type of each content item. Additionally, online content management system 106 can identify data in the content items including text data, image data, audio data, and/or video data. Data in the content items can allow online content management system 106 to further identify characteristics of the content items, such as, but not limited to, the subject matter of the content items, location data for the content items, and other metadata associated with the content items. The online content management system 106 then uses the identified characteristics and naming patterns to train the machine-learning model.

In one or more embodiments, online content management system 106 analyzes the content items 202 based on the determined characteristics of the content items to train the machine-learning model. Specifically, online content management system 106 can compare content items to other content items within the same storage location, such as within a single folder or group of related content items. Online content management system 106 can compare content items to other content items with similar names to identify characteristics that the content items have in common.

Analyzing the content items allows online content management system 106 to determine 204 naming patterns from the identified content items. In particular, online content management system 106 analyzes the names and characteristics of the content items, to identify certain relationships between selected names and the content items. By identifying the relationships between the names and the content items, online content management system 106 can learn naming patterns, such as identifying how the user or users who stored the content items name the content items. As such, online content management system 106 trains the machine-learning model to identify naming patterns in connection with specific characteristics of the content items as the user stores and/or names the content items.

Optionally, the machine-learning model can determine a plurality of predefined terms as name suggestions for one or more users. For example, online content management system 106 can detect that a plurality of content items are associated with a scanning device at client device 104 associated with scanning documents or images. The machine-learning model can learn to identify patterns in the types of documents that the user scans using the scanning device and generate name suggestions based on the identified patterns. To illustrate, if the user frequently scans receipts and tickets, the machine-learning model can determine that the content item is associated with the scanning device and provide predefined terms for receipts and tickets. Additionally, the predefined terms can include previously used name suggestions that a user has selected (e.g., a history of name suggestions that the user has previously selected for naming other content items).

Identifying naming patterns can include determining that the user or users name content items of a certain type a certain way, or that a specific user names all content items in a certain way, regardless of content or type. For example, online content management system 106 can analyze names of content items to determine how each content item is named. To illustrate, online content management system 106 can parse the names of the content items to identify words, numbers, characters, or combinations thereof in the content items. Additionally, online content management system 106 can identify formatting of the names of the content items (e.g., a date format in the names).

In one or more embodiments, client device 104 optionally allows a user to create 206 a content item. Specifically, a user can use client device 104 to create a content item using a client application running on client device 104. In some embodiments, the client application is specific to the online content management system 106. Additionally, the client application can be a native application that the user installs and runs on client device 104. Alternatively, the client application can be a web-based application that the user runs via a web browser. As mentioned, the content item can include text data, image data, audio data, and/or video data. As such, the content item can be a text document, an image, an audio file, a video file, or a combination of more than one type of file with mixed media content. Alternatively, the user can access a previously created content item to modify the content item, such as to rename the content item.

After creating the content item, the user can opt to store the content item on online content management system 106. In particular, client device 104 can identify a request to store a content item on online content management system 106. For example, the client device can display an option within a user interface of the client application or of another application that is linked to the client application to allow the user to upload and store the content item to online content management system 106. In other embodiments, the user can use a client application specific to the online content management system 106 to create or store the content item, which application can automatically communicate a request to store the content item to online content management system 106.

In one or more embodiments, in response to a selection of an option to store the content item, client device 104 determines that the user is attempting to store the content item on the storage device of online content management system 106. Specifically, online content management system 106 can first determine that the user has a user account with online content management system 106. For example, online content management system 106 can determine that the user has a user account based on a token or other credentials associated with the client application on client device 104. Online content management system 106 can maintain a database of user accounts (including the user account of the user of client device 104) that the corresponding users can access to store content items at online content management system 106.

In connection with the option to store the content item, client device 104 identifies 208 a request to name the content item. For example, a client application running on client device 104 can automatically generate the request to name the content item after the user selects an option to store the content item on online content management system 106. Alternatively, the client application can identify an explicit request from the user to name a content item that the user previously created and named. Thus, the user can create and name new content items or rename old content items associated with the user account of the user.

In one or more embodiments, one or more components of naming system 100 of FIG. 1 determine 210 characteristics of the content item. In particular, naming system 100 can analyze the content item to determine a data type of the content item. For example, client device 104 can determine one or more characteristics of the content item such as whether data in the content item is text data, image data, audio data, and/or video data, as described above with respect to training the machine-learning model.

According to one or more embodiments, analyzing the content item includes using word processing, optical character recognition analysis, image processing, and/or audio processing techniques to identify characteristics of the content item. For example, in response to detecting that the user has captured an image or created any type of content item, client device 104 can analyze the content item using one or more of the above techniques. Alternatively, client device 104 can send the content item to online content management system 106 so that online content management system 106 can analyze the content item using one or more of the above techniques and prepare the content item for storage. In one or more embodiments, client device 104 can perform certain analyses on content items and online content management system 106 can perform other analyses on content items, depending on the capabilities of client device 104 and online content management system 106.

In one or more embodiments, instead of sending the content item to online content management system 106, client device 104 computes a signature (or uses a pre-computed signature) based on the content item to send to online content management system 106. For example, client device 104 can compute a digital signature for the content item indicating the characteristics of the content item. The digital signature can include a representation of the characteristics of the content item for online content management system 106 to use in comparing to signatures of previously stored content items to determine whether the content item is similar to any of the other content items.

After determining the characteristics of the content item, naming system 100 uses the machine-learning model to provide name suggestions based on the characteristics. Specifically, FIG. 2 illustrates that client device 104 determines the characteristics and then sends 212 the characteristics of the content item to online content management system 106. Additionally, client device 104 can provide user account information, such as login credentials or a token, to online content management system 106 for identifying a user account associated with the user.

In one or more embodiments, online content management system 106 accesses the user account associated with the user of client device 104. In particular, online content management system 106 accesses the user account associated with the user based on login credentials or a token from client device 104. Accessing the user account allows online content management system 106 to identify user information such as, but not limited to, a user identifier, preferences associated with the user, and content items associated with the user. Accessing the user account also allows online content management system 106 to store the content item from client device 104 with previously stored content items (if any). In one example, the user can establish a persistent login session with the user account, such that online content management system 106 learns the user account information from the persistent login session.

In response to receiving or otherwise identifying the characteristics of the content item, online content management system 106 uses the trained machine-learning model to provide name suggestions for naming the content item. In one or more embodiments, online content management system 106 determines 214 a plurality of name suggestions that correspond to name suggestions using the machine-learned training model. For example, online content management system 106 uses the machine-learning model to identify one or more name segments based on the previously stored content items. To illustrate, online content management system 106 can provide the most likely name segments for the user to name the content item. Specifically, the most likely name segments can be name segments that the user would name the content item based on the naming patterns from the machine-learning model.

According to one or more embodiments, online content management system 106 determines the name suggestions to provide to client device 104 based on a score or ranking associated with each name suggestion. A score can be a value (e.g., numerical value) that allows online content management system 106 to compare a likelihood of use of a name segment to other name segments. In particular, online content management system 160 can determine a plurality of candidate name segments based on the characteristics of the content item. Online content management system 106 can generate a score for each name segment based on the similarity of the content item to other content items using the machine-learning model. Thus, if the content item is very similar to other content items (e.g., shares many characteristics), online content management system 106 can assign higher scores to name segments associated with the other content items. To illustrate, if the content item is similar to other content items named using a date of the item in a particular format, online content management system 106 can rank a name segment with the particular date format above other name segments.

In one or more embodiments, online content management system 106 determines a default name or suggested name that includes one or more name segments associated with the determined name suggestions. For example, online content management system 106 can select a plurality of name segments based on the scores associated with the name segments. Online content management system 106 can also order the name segments based on scores and/or naming conventions that the user typically uses. For example, if the user typically uses a timestamp and then a location for naming photographs, online content management system 106 can create a suggested name that includes a suggested timestamp segment followed by a suggested location segment.

After online content management system 106 determines the name segments, online content management system 106 sends 216 the determined name suggestions to client device 104. For example, online content management system 106 can send a plurality of identified name segments to client device 104. Alternatively, online content management system 106 can send a limited number of name segments to client device 104, depending on the settings or capabilities of client device 104, or based on a predetermined threshold number of name segments.

Client device 104 provides 218 graphical elements representing the received name suggestions in a GUI of a display device of client device 104. In particular, client device 104 can determine one or more name suggestions to display within a user interface of the client application running on client device 104. For example, the client application can include settings or preferences that display a predetermined number of name suggestions. To illustrate, the client application may have limited space for displaying name suggestions. Thus, the client application may select a predetermined number of the highest scored/ranked name suggestions to display. Alternatively, the client application may display all of the name suggestions within the user interface (e.g., in a scrollable list).

In one or more embodiments, client device 104 displays the name suggestions as selectable elements. Specifically, client device 104 can display each name suggestion as a graphical element that a user may select within the client application to include in the name for the content item. For example, as described in more detail below, client device 104 can display the name segments as individually selectable icons or list elements. Client device 104 can then identify 220 one or more selected graphical elements displayed in the GUI. Additionally, in one or more embodiments, client device 104 adds 222 name segment(s) corresponding to the selected graphical element(s) to the name of the content item. If the user of client device 104 selects a plurality of name graphical elements, client device 104 can detect a selection order and adds the corresponding name segments in the order in which client device 104 detects the selection of the graphical elements.

After client device 104 detects the selected name segments and stores the content item with a name based on the selected name segments, client device 104 can send 224 the name and/or the content item to online content management system 106. In particular, if client device 104 has not previously sent the content item to online content management system 106, client device 104 can send the content item with the selected name to online content management system 106 for storage. Online content management system 106 stores the content item with the selected name (e.g., selected name segment(s) and/or manually entered name segments). Alternatively, if client device 104 has already sent the content item to online content management system 106 in preparation for storing the content item, client device 104 can send the name of the content item to online content management system 106 for online content management system 106 to store 226 the content item with the name.

Online content management system 106 can then use the selected name of the content item to update 228 the machine-learning model based on the content item and the selected name. Thus, online content management system 106 can continuously train the machine-learning model to recognize naming patterns associated with new content and update naming patterns as naming patterns evolve. For example, online content management system 106 can train the machine-learning model to recognize naming patterns associated with new types of content or with content items having previously identified characteristics. Additionally, users can change naming patterns over time, and the machine-learning model can learn to recognize changes in naming patterns and give weight to more recent naming patterns when providing further name suggestions.

As previously mentioned, online content management system 106 can also train the machine-learning model to recognize naming patterns for a plurality of user accounts. Online content management system 106 can use the content item from client device 104 to update the machine-learning model for use in providing name suggestions to other users. Thus, online content management system 106 can provide name suggestions to a plurality of users if the plurality of users as a whole have a specific naming convention for content items or if users want to name content items similarly to the way other users name content items for any reason. Additionally, online content management system 106 can provide different name suggestions to the other users if the naming patterns for one or more users change over time.

In one or more embodiments, online content management system 106 can apply different weights to users for training the machine-learning model. For example, online content management system 106 can apply a greater weight to a subset of users associated with a plurality of users. To illustrate, online content management system 106 can apply the machine-learning model to a plurality of user accounts associated with a company. The machine-learning model can weight naming patterns associated with managers or administrators of the company higher than others so that names of content items associated with the managers or administrators influence the name suggestions more than the names of content items of other users. Alternatively, online content management system 106 may use only the naming patterns of the subset of users to train the machine-learning model for providing name suggestions to the entire group of users.

FIG. 2 describes an example process for providing machine-learned name suggestions when identifying a request to store or name a content item. As one can appreciate, providing name suggestions can occur in a remote storage environment (e.g., as displayed in FIG. 1) or in a local storage environment (e.g., on a local network or on a single client device). Accordingly, the operations for creating content and training/using a machine-learning model to provide name suggestions can occur on different devices or on the same device. For example, client device 104 can create and store content locally and also train/use a machine-learning model to provide name suggestions to the user without communicating with a separate server device or system such as online content management system 106. As such, the sequence of operations and the number and type of devices/systems of the system can be different than those described in relation to FIG. 2.

As will be described in more detail below, the components of the naming system 100 as described with regard to FIG. 1 can provide, along and/or in combination with the other components, graphical user interfaces. In particular, the components can allow a user to create a content item and store the content item. Additionally, components allow the user to determine one or more settings for the content item, including a name of the content item. In particular, FIGS. 3A-3C and the description that follows illustrate various example embodiments of the user interfaces and features of a client application that allows a user to create content items and name the content items using machine-learned name suggestions.

Figure 3B:
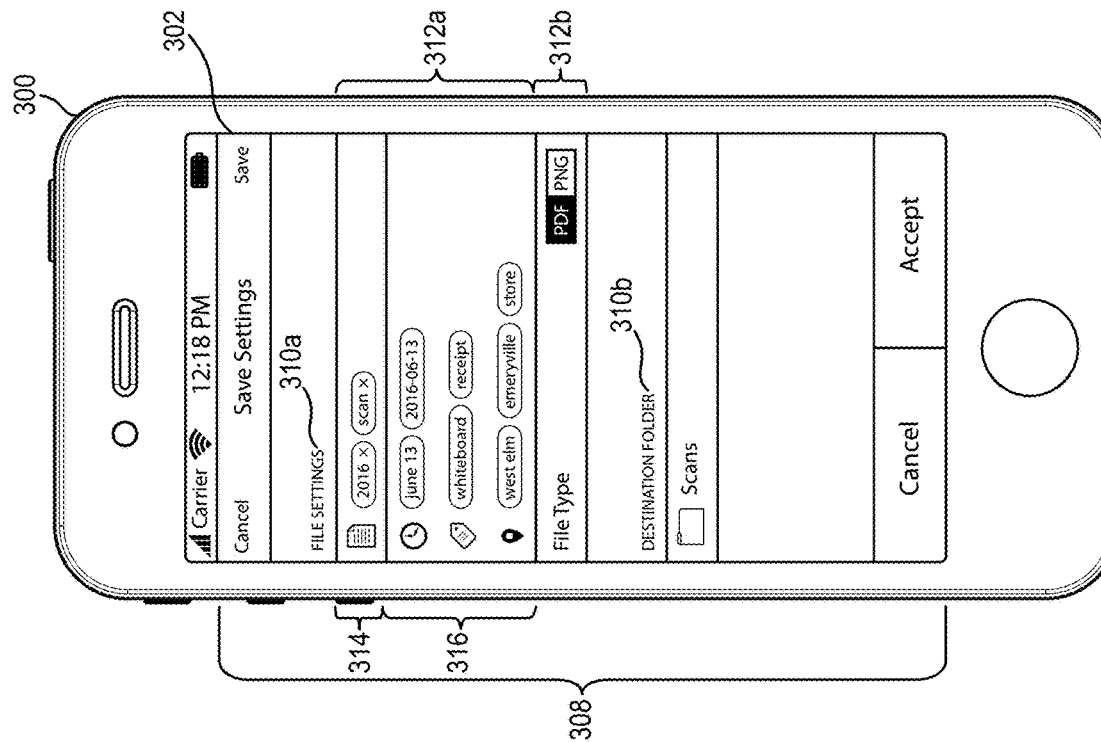
Figure 3A:
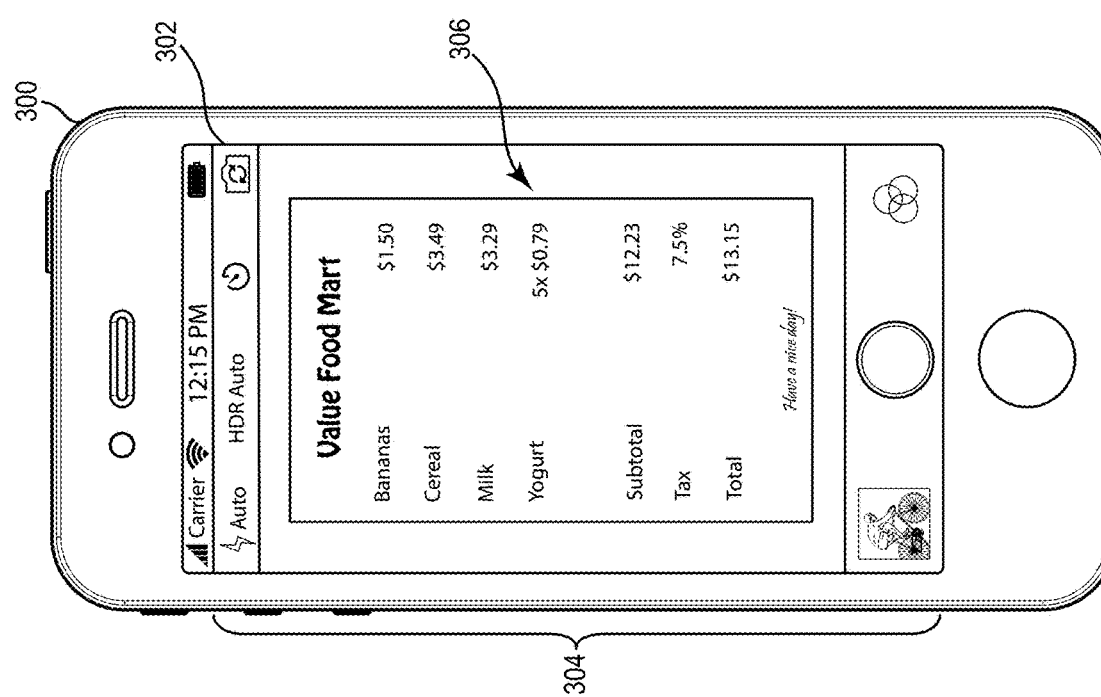

As illustrated, FIGS. 3A-3C include client device 300 as a touchscreen computing device. The client device 300 may be a handheld device with a touchscreen. As used herein, the term "handheld device" refers to a device sized and configured to be held/operated in a single hand of a user. In additional or alternative example, however, client device 300 can be any suitable computing device, such as, but not limited to, a tablet device, a handheld device, larger wireless devices, laptop or desktop computer, a personal-digital assistant device, and/or any other suitable computing device that can create or edit content and communicate with other devices using a data connection.

With reference to FIG. 3A, client device 300 includes client application 302 that allows a user to capture, store, manage, create, and/or edit content within a content interface 304. For example, client application 302 can include an image capture application or scanning application that allows a user to capture images of documents. To illustrate, FIG. 3A illustrates a captured image of a receipt, though client application 302 can allow the user to capture images of other documents. Alternatively, client application 302 can allow the user to capture, create, and/or modify other types of content, such as text files or multimedia files (e.g., video/audio).

As shown, client application 302 displays a captured image 306 of the receipt within content interface 304. For instance, after the user captures an image of the receipt, content interface 304 can display captured image 306 of the receipt within an image view of the content interface 304. In at least some implementations, client application 302 also allows the user to edit captured image 306, such as by modifying colors, lighting, size, or other visual characteristics of captured image 306. Additionally, client application 302 can allow the user to capture a new image of the document if captured image 306 has low quality.

According to one or more embodiments, client application 302 allows a user to interact with previously stored content items associated with a user account of the user. In particular, client application 302 can include a file structure (or other system of content management) that allows the user to navigate within the file structure and interact with the previously stored content items in one or more ways. For example, the user can organize the content items within the file structure associated with the user account. To illustrate, the user can create folders or item groups and move content items from one group to another. Client application 302 can update the file structure on client device 300 as well as on a remote storage device (e.g., of online content management system 106) associated with the user account to allow the user to access and view the file structure on other client devices.

Client application 302 can also allow the user to view previously stored content items. For instance, the user can select a previously stored content item in the file structure to view in the content interface 304 or in another interface of client application 302. The user can also modify the previously stored content items within client application 302, as described above. Thus, client application 302 can provide a plurality of operations for users to create, interact with, and/or modify content items.

As illustrated in FIG. 3B, client application 302 of client device 300 also allows the user to determine one or more settings for the content item. In particular, client application 302 includes a settings interface 308 to allow the user to set one or more settings of the content item when storing the content item. The settings can allow the user to set one or more characteristics associated with the content item. For example, settings interface 308 can include file settings 310a and destination folder 310b. Although FIG. 3B illustrates certain settings for the content item, client application 302 can allow user to determine other settings for the content item other than, or in addition to, those shown in FIG. 3B.

In one or more embodiments, settings interface 308 includes file settings 310a to allow the user to set a plurality of characteristics of the content item for storing the content item on a storage device (e.g., online content management system 106 of FIG. 1). Specifically, settings interface 308 allows the user to set a filename of the content item and a file type of the content item. For example, file settings 310a include a filename section 312a to display name suggestions, as described herein. Additionally, file settings 310a include a file type section 312b to allow the user to set the file type (e.g., extension) of the content item (e.g., PDF, PNG, or other file type based on the type of content item and compatible extensions).

According to one or more embodiments, filename section 312a displays filename 314 for the content item. Filename 314 includes a name for the content item in a first portion of filename section 312a. For instance, when the user first selects an option to store the content item, settings interface 308 can display filename 314 without a name, as illustrated in FIG. 3B. Alternatively, settings interface 308 can display filename 314 with a default (i.e., auto-populated or prepopulated) name based on one or more criteria from the machine-learning model, as described below.

In one or more embodiments, a prepopulated name can include one or more name segments in filename 314. For example, the prepopulated name can include one or more name segments based on the scores associated with the name segments. To illustrate, client application 302 can select a plurality of name segments with the highest scores for prepopulating filename 314. Additionally, the prepopulated name can include name segments that conform to the naming conventions associated with the naming pattern of the user (e.g., based on number of name segments, categories of name segments, formats of name segments). For instance, client application 302 can select a plurality of name segments from a plurality of different categories. Thus, client application 302 selects the prepopulated name without including multiple name segments from the same category if the user does not typically use multiple name segments from that category in the name, even if the scores of more than one name segment in the category are higher than the scores of name segments in another category. Alternatively, client application 302 can display a plurality of name segments without categories Additionally, filename section 312a displays a plurality of graphical elements associated with name suggestions in a second portion of filename section 312a. In particular, graphical elements 316 include a plurality of selectable graphical elements that correspond to name suggestions that the machine-learning model determines for the content item. For example, graphical elements 316 can include a plurality of name suggestions that the machine-learning model has determined that the user is most likely to use for naming the content item. Client application 302 allows the user to select a name for the content item when storing the content item.

Client application 302 also allows the user to modify a current name of the content item (e.g., if the user is modifying a previously stored content item) by moving, removing, or adding one or more name segments.

In various embodiments, graphical elements 316 are based on name segments of previously named content items. Specifically, graphical elements 316 can include the same or similar name segments according to the training of the machine-learning method. For example, because the machine-learning model learns a naming pattern using the previously named content items, the machine-learning model can use the learned naming pattern to identify specific name segments or patterns of name segments to create graphical elements 316. To illustrate, the machine-learning model can learn that the user typically labels scanned documents with a timestamp of a particular format and an indication that the document is a scan. Thus, graphical elements 316 are based on the naming patterns corresponding to the previously named content items associated with the user's account.

The machine-learning model can use a plurality of cues associated with characteristics of the content item to determine whether to provide a particular name segment. In particular, the machine-learning model can generate a score for each name segment based on a plurality of cues such as timestamp of creation/upload, key metadata fields (e.g., PDF keywords, EXIF keywords), similarity to other files/folders, location data, calendar events, trained classifiers (e.g., for text, images, video, audio), key phrases identified in the content, and/or combinations of any of the above. As one can appreciate, not all cues are associated with every content item of every type. Additionally, certain cues can be more applicable to a given name segment than other cues. Thus, one or more embodiments of the machine-learning model generate the score by determining weights to the different cues as they pertain to a name segment based on the characteristics of the content item.

According to one or more embodiments, to generate the score for a name segment, the machine-learning model combines the weighted values of the various cues for the name segment. For example, the machine-learning model can combine the weighted values by adding, multiplying, or otherwise using a mathematical algorithm to generate a numerical score for the name segment. To illustrate, the machine-learning model can apply a higher weight to cues that are most applicable to a name segment and a lower weight to cues that are least applicable to the name segment. As a result, the score for the name segment can be higher or lower depending on the weights given to each of the cues and the number of cues with higher weights. In alternative examples, the machine-learning model can generate the score for a name segment by using another weighting/scoring system based on a plurality of cues associated with characteristics of a content item.

After determining the scores for the name segments, the machine-learning model ranks the name segments. Specifically, the machine-learning model ranks the name segments according to the corresponding scores for determining which name segments to display. In one or more embodiments, the machine-learning model ranks the name segments by determining that a name segment with the highest score is first, a name segment with a next highest score is second, etc. The machine-learning model can thus rank the name segments until all of the name segments are ranked. Alternatively, the machine-learning model can rank a number of name segments up to a predetermined threshold number, as determined by a preference or setting.

The user can select one or more name segments from graphical elements 316 to apply to filename 314 by selecting the desired graphical elements 316. For example, the user can select one or more of graphical elements 316 by tapping on the selected elements via a touchscreen of client device 300. Alternatively, the user can select from graphical elements 316 by dragging each selected name element into the first portion of filename section 312a. Selecting one or more graphical elements 316 thus adds the selected name segments to filename 314, as illustrated in FIG. 3C. For instance, settings interface 308 can add selected graphical elements 318 to filename 314 in an order in which the user selects the elements.

Additionally, the user can remove one or more of selected graphical elements 318 from filename 314. Specifically, after selecting one or more graphical elements to include in filename 314, settings interface 308 can display selected graphical elements 318 as individual selectable elements. For example, settings interface 308 can display selected graphical elements 318 as separate tags within an input field associated with filename 314. Selecting a given name element within filename 314 by tapping the given name element or a specific portion of the given name element (e.g., an "x" or other indicator) causes client application 302 to remove the given name element from filename 314. Alternatively, the user can select a name element to insert into filename 314 or to remove from filename 314 by tapping/clicking and dragging within settings interface 308.

Additionally, settings interface 308 can allow the user to manually input one or more portions of the name of the content item. For example, filename 314 can allow the user to manually enter text or characters as filename 314. In one or more embodiments, settings interface 308 allows the user to enter the name of the content item via a keyboard interface. To illustrate, after the user manually enters the name or a portion of the name of the content item, settings interface 308 can convert the manually entered text to a selectable element similar to graphical elements 316. Additionally, settings interface 308 can allow the user to input at least a portion of filename 314 using graphical elements 318 and another portion of filename 314 with manually entered characters.

According to one or more embodiments, as the user selects graphical elements to add to filename 314, client application 302 can update the graphical elements 316 included in the second portion of the filename section 312a to include one or more additional name segments. Specifically, if the user selects a first name segment from graphical elements 316, client application 302 moves the first name segment to filename 314. Client application 302 can also replace the first name segment in a selection area of settings interface 308 with another name segment. For example, client application 302 can select a new name segment based on a score of the second name segment. Additionally, client application 302 can select the second name segment based on a category to which the first name segment belongs, for example, by selecting the second name segment from the same category. As illustrated in FIG. 3C, adding a name segment ("store") from a category (a location category) to filename 314 causes client application 302 to display a new name segment ("california") in the available space of the category. Alternatively, client application 302 may not replace the first name segment with another name segment.

In one or more embodiments, selecting a name segment from a category can cause client application 302 to replace the category with another category. For example, if the user selects a preferred name element from a specific category, client application can replace the category with another category. To illustrate, if the user selects a name segment with a timestamp of a specific format from a time category, client application 302 can replace the time category with another category. Alternatively, if the user selects a name segment from a category that has no more possible name segments, client application 302 can replace the empty category with a new category. Accordingly, replacing a first category with a second category causes client application 302 to display graphical elements for name suggestions associated with the replacement category.

In one or more embodiments, client application 302 organizes graphical elements 316 in a way that allows the user to easily find a specific name suggestion or type of name suggestion. In particular, client application 302 can organize graphical elements 316 according to the characteristics of the content item. For example, settings interface 308 can display graphical elements 316 in a plurality of categories that correspond to the characteristics of the content item. As described previously, the system can provide name segments based on one or more cues associated with the content items. The system can also use the cues to identify a plurality of categories in which to display graphical elements 316.

As FIG. 3C illustrates, settings interface 308 displays graphical elements 316 for timestamp category 320a, content type category 320b, and location category 320c. As described in more detail below, settings interface 308 can include a plurality of categories of different name segments from which the user can select one or more graphical elements to add to filename 314. In one or more alternative embodiments, settings interface 308 includes other categories, such as subcategories of the categories illustrated in FIG. 3C, or categories associated with other characteristics of the content item. The categories can be indicated by category icons, font differences, emojis, etc., in a way that allows the user to easily distinguish the categories from one another.

According to one or more embodiments, timestamp category 320a displays a plurality of name segments for a time of creation/storing. For instance, the different name segments can include varying combinations of the day of the week, date, month, year, and even current time of day. Additionally, the time formats can include different date formats that display the same information in a different way. To illustrate, the different date formats can include a first name segment with month-day-year, a second name segment with day-month-year, etc. Timestamp category 320a can also display name segments based on the machine-learning model, such that timestamp category 320a includes and/or displays name segments that the user is likely to use based on the user's naming patterns.

Content type category 320b displays name segments corresponding to a type of content item. Specifically, content items can come from different sources and include different types of data, as mentioned previously. For example, content type category 320b can include name segments related to the source (e.g., scanned content item, photograph) and/or related to the contents (e.g., audio/video file, image, text document). Content type category 320b can also include name segments related to one or more specifically identified characteristics of the contents, such as a name segment indicating that the content item is an image of a whiteboard. Thus, content type category 320b includes a broad range of possible name segments based on the contents of the content item.

FIG. 3C also includes location category 320c that includes name segments related to a location associated with the content item. For example, the name segments can be related to location data corresponding to a location at which the user created the content item. To illustrate, location category 320c can include a location associated with GPS data for the content item including, but not limited to, an address, a location name, a business or residence, or a landmark. Name segments indicating location of the content item can especially be useful if the user names content items such as photographs based on the location of the photographs. Additionally, the location data can include different descriptions of the location such as street address, name of location, city, state, country, etc.

As mentioned, settings interface 308 can also include other subcategories or additional categories based on the characteristics of the content item. For example, additional categories can include an application that the user used to create the content item; calendar information such as meeting time/place/participants; characters, words, or phrases in the content item; preferences or settings associated with the content item; content item length; formatting of the content item; or other content characteristics of the content item. According to one or more embodiments, client application 302 selects a predetermined number of categories to display within settings interface 308. The number of categories to display may depend on available space within the display, user preferences, or other criteria.

In one or more embodiments, settings interface 308 displays the categories and corresponding name segments based on the machine-learning model. Specifically, the machine-learning model determines the most likely name segments for the content item in accordance with a naming pattern, as described previously. Additionally, if client application 302 provides categories of name segments, the machine-learning model also determines the most likely categories for the content item. For example, the machine-learning model can determine the most likely categories based, at least in part, on the most likely name segments. To illustrate, if the machine-learning model determines that the user is most likely to use a name segment from a particular category, the machine-learning model can select that category to display. In another example, the machine-learning model can select a category based on the number of corresponding name segments having a score that meets a predetermined threshold.

FIG. 3D illustrates an embodiment of client application 302 that provides name suggestions to a user in response to the user typing characters in name interface 322. In particular, client application 302 can allow the user to select a filename of a content item that the user wants to store on a storage device (e.g., online content management system 106). Selecting the filename can cause client application 302 to display name interface 322 including input field 324 into which the user can manually enter a name of the content item.

In one or more embodiments, client application 302 can detect that the user has entered text into input field 324. Client application 302 can analyze the text to determine whether the text contains certain characters, words, or phrases. For example, client application 302 can determine whether the user has entered a name segment that corresponds to a specific category. To illustrate, client application 302 can determine that the user has entered a date of a certain format into input field 324. Based on the entered text, client application 302 can display one or more name suggestions in list of name suggestions 326 according to an identified naming pattern. As such, list of name suggestions 326 can include name suggestions that correspond to names that include dates, as illustrated in FIG. 3D. Additionally, list of name suggestions 326 can include name suggestions that are based on the content item, or based on a predefined list of name suggestions that the user often uses.

The user can select a name suggestion from list of name suggestions 326 to add to the selected name suggestion in input field 324. Additionally, list of name suggestions 326 can then update to include additional name suggestions based on the manually entered text and the selected name suggestions. In one or more additional embodiments, client application 302 can also use text from a partially entered name suggestion to provide name suggestions that include the partially entered name and according to the naming pattern. For example, if the user enters "re" into input field 324, list of name suggestions 326 can include name suggestions that begin with "re" according to the naming pattern of the user (e.g., "receipt", "report", "registration").

FIGS. 1-3C, the corresponding text, and the examples, provide a number of different systems and devices for providing machine-learned name suggestions when naming digital content items. In addition to the foregoing, embodiments can be described in terms of flowcharts comprising acts and steps in a method for accomplishing a particular result. For example, FIGS. 4 and 5 illustrate flowcharts exemplary methods in accordance with one or more embodiments.

Figure 4:
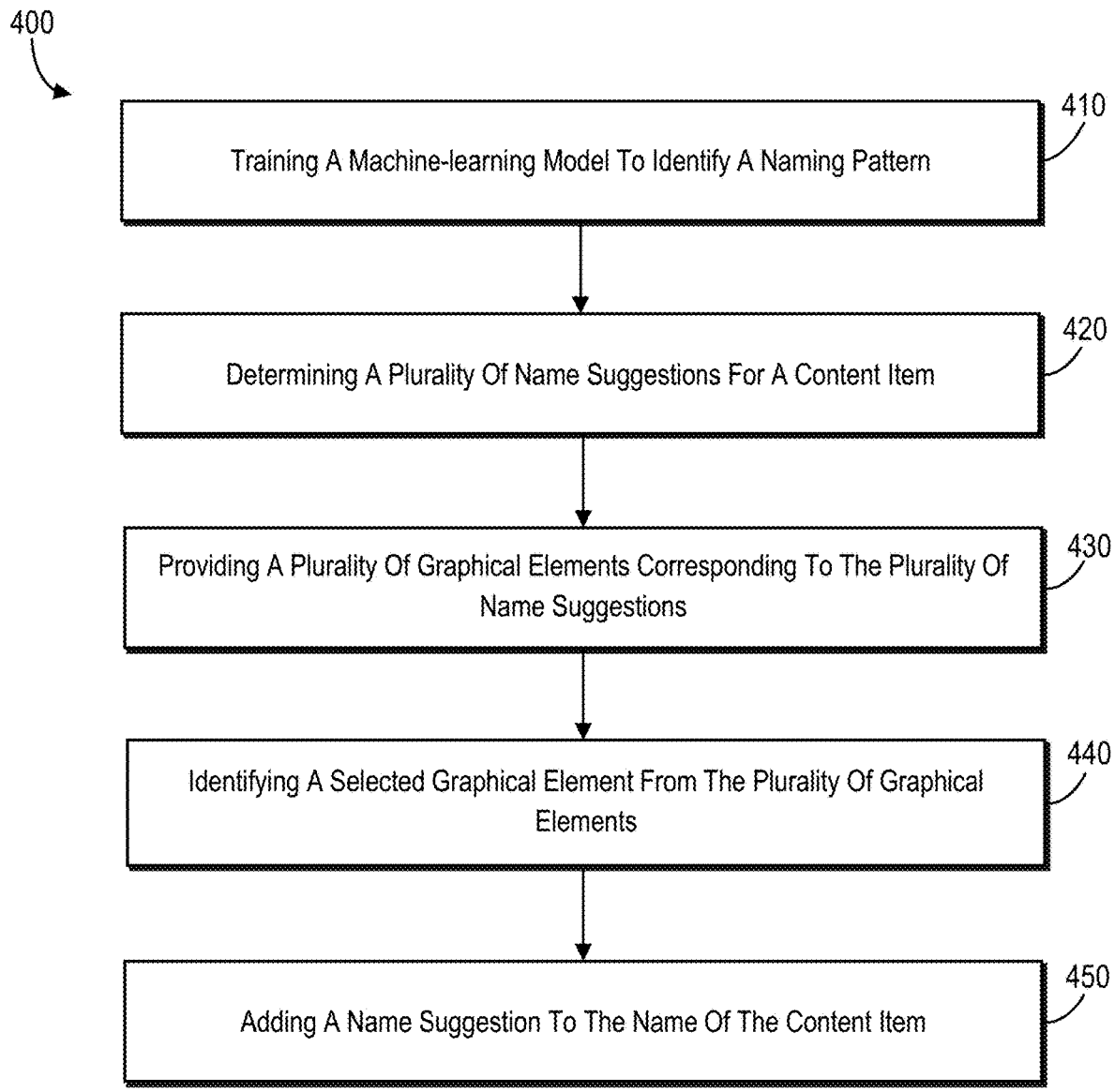
FIG. 4 illustrates a flowchart of a series of acts in a method of providing name suggestions for a content item in accordance with one or more embodiments.
Figure 5:
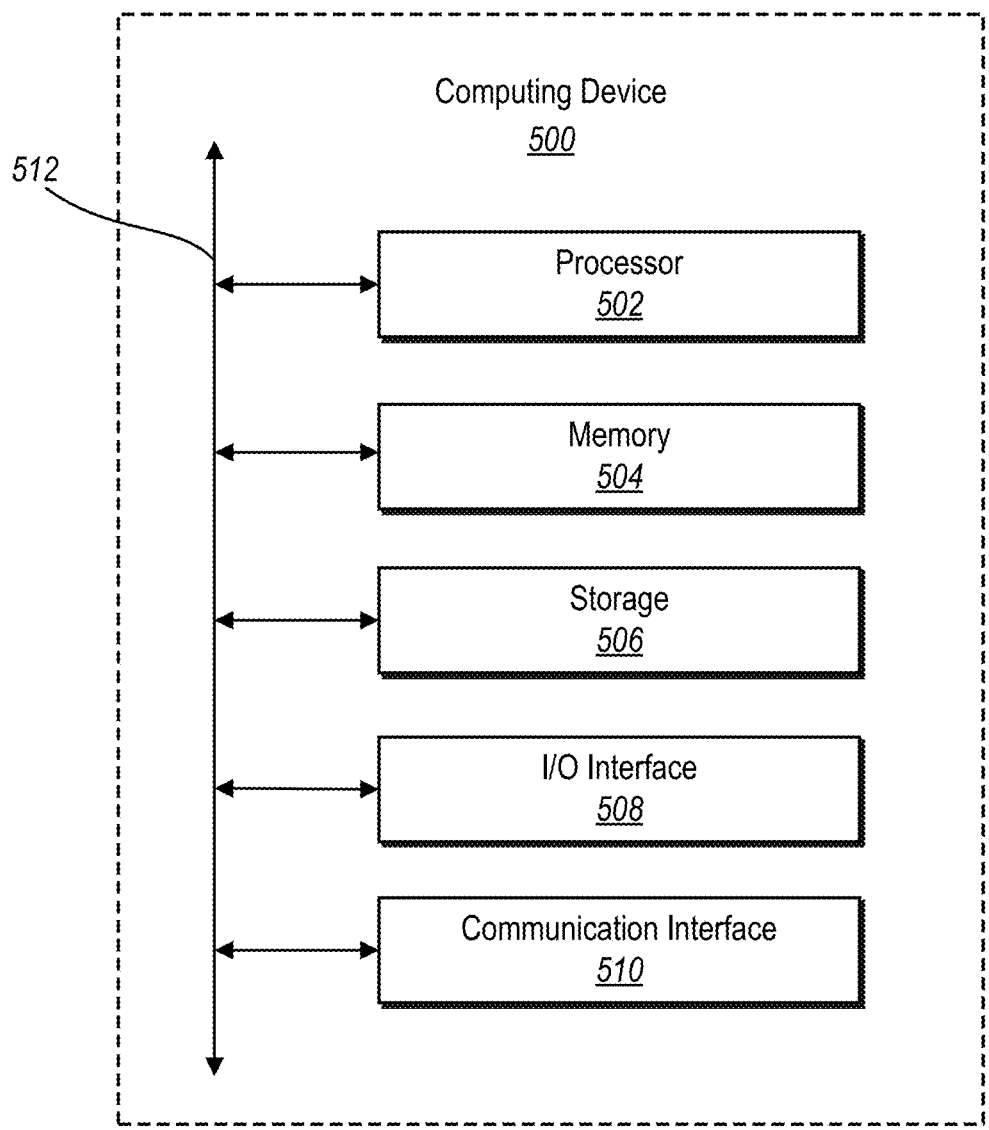
FIG. 5 illustrates a block diagram of a computing device in accordance with one or more embodiments.

FIG. 4 illustrates a flowchart of method 400 of providing name suggestions for a content item. Method 400 includes act 402 of training a machine-learning model to identify a naming pattern. For example, act 402 involves training, based on characteristics of a plurality of previously named content items corresponding to a user account, a machine-learning model to identify a naming pattern associated with the plurality of previously named content items. Act 402 can also involve training the machine-learning model to identify a naming pattern associated with a plurality of user accounts. For example, the plurality of user accounts are associated with a related group of users.

Method 400 further includes act 404 of determining a plurality of name suggestions for a content item. For example, act 404 involves determining, using the machine-learning model, a plurality of name suggestions for a content item associated with the user account. Act 404 can involve determining one or more characteristics of the content item, and using the machine-learning model to determine the plurality of name suggestions based on the one or more characteristics of the content item. Act 404 can also involve generating, using the machine-learning model, a plurality of scores for the plurality of name suggestions.

Method 400 also includes act 406 of providing a plurality of graphical elements corresponding to the plurality of name suggestions. For example, act 406 involves providing, for display in a graphical user interface, a plurality of graphical elements corresponding to the plurality of name suggestions for naming the content item. The plurality of name suggestions can include a plurality of name segments.

Act 406 can also involve selecting, for display in the graphical user interface and based on the plurality of scores for the plurality of name suggestions, a plurality of graphical elements 316. For example, act 406 can involve selecting a plurality of graphical elements 316 corresponding to a plurality of name suggestions comprising scores that meet a predetermined threshold. Alternatively, act 406 can involve selecting a predetermined number of graphical elements from the plurality of graphical elements 316.

As part of act 406, or as an additional act, method 400 can include providing the plurality of graphical elements 316 in a plurality of different categories based on one or more characteristics of the plurality of name suggestions. Additionally, method 400 can include ranking the categories for displaying within the graphical user interface. For example, method 400 can include ranking the categories based on the plurality of scores for the plurality of name suggestions.

Method 400 also includes act 408 of identifying a selected graphical element from the plurality of graphical elements. For example, act 408 can involve detecting a user input to select a graphical element from the plurality of graphical elements. To illustrate, act 408 can involve detecting a touch-and-drag motion to move the selected graphical element from the plurality of graphical elements to a name area of the graphical user interface.

Additionally, method 400 includes act 410 of adding a name suggestion to the name of the content item. For example, act 410 involves adding a name suggestion corresponding to the selected graphical element to the name of the content item. Act 410 can involve appending the name suggestion corresponding to the selected graphical element to an end of the name of the content item. Alternatively, act 410 can involve inserting the name suggestion corresponding to the selected graphical element to an indicated location in the name of the content item.

As part of act 410, or as an additional act, method 400 can include identifying a plurality of selected graphical elements from the plurality of graphical elements, and adding a plurality of name suggestions corresponding to the plurality of selected graphical elements to the name of the content item. Additionally, adding the plurality of name suggestions corresponding to the plurality of selected graphical elements to the name of the content item can involve adding the plurality of name suggestions in an order corresponding to an order in which the plurality of selected graphical elements are selected.

As part of act 410, or as an additional act, method 400 can include enabling, for display in the graphical user interface, modification of the name of the content item by adding, removing, or rearranging one or more graphical elements corresponding to one or more name suggestions. For example, method 400 can include detecting an input to modify a position of one or more graphical elements in the name of the content item, and modifying the position of the one or more graphical elements based on the detected input.

Method 400 can also include an act of preselecting one or more graphical elements from the plurality of graphical elements 316, and auto-populating the name of the content item with one or more corresponding name suggestions. For example, method 400 can preselect one or more graphical elements with highest scores for auto-populating the name of the content item. Additionally, method 400 can auto-populate the name of the content item with the one or more preselected graphical elements in an order based on the naming pattern.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 5 illustrates a block diagram of exemplary computing device 500 that may be configured to perform one or more of the processes described above. One will appreciate that client device 104 and/or online content management system 106 may comprise one or more computing devices such as computing device 500. As shown by FIG. 5, computing device 500 can comprise processor 502, memory 504, storage device 506, I/O interface 508, and communication interface 510, which may be communicatively coupled by way of communication infrastructure 512. While an exemplary computing device 500 is shown in FIG. 5, the components illustrated in FIG. 5 are not intended to be limiting. Additional or alternative components may be used in other embodiments. Furthermore, in certain embodiments, computing device 500 can include fewer components than those shown in FIG. 5. Components of computing device 500 shown in FIG. 5 will now be described in additional detail.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage device 506 and decode and execute them. In particular embodiments, processor 502 may include one or more internal caches for data, instructions, or addresses. As an example and not by way of limitation, processor 502 may include one or more instruction caches, one or more data caches, and one or more translation lookaside buffers (TLBs). Instructions in the instruction caches may be copies of instructions in memory 504 or storage 506.

Memory 504 may be used for storing data, metadata, and programs for execution by the processor(s). Memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 504 may be internal or distributed memory.

Storage device 506 includes storage for storing data or instructions. As an example and not by way of limitation, storage device 506 can comprise a non-transitory storage medium described above. Storage device 506 may include a hard disk drive (HDD), a floppy disk drive, flash memory, an optical disc, a magneto-optical disc, magnetic tape, or a Universal Serial Bus (USB) drive or a combination of two or more of these. Storage device 506 may include removable or non-removable (or fixed) media, where appropriate. Storage device 506 may be internal or external to computing device 500. In particular embodiments, storage device 506 is non-volatile, solid-state memory. In other embodiments, Storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 508 allows a user to provide input to, receive output from, and otherwise transfer data to and receive data from computing device 500. I/O interface 508 may include a mouse, a keypad or a keyboard, a touch screen, a camera, an optical scanner, network interface, modem, other known I/O devices or a combination of such I/O interfaces. I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 508 is configured to provide graphical data to a display for presentation to a user. The graphical data may be representative of one or more graphical user interfaces and/or any other graphical content as may serve a particular implementation.

Communication interface 510 can include hardware, software, or both. In any event, communication interface 510 can provide one or more interfaces for communication (such as, for example, packet-based communication) between computing device 500 and one or more other computing devices or networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 512 may include hardware, software, or both that couples components of computing device 500 to each other. As an example and not by way of limitation, communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 6:
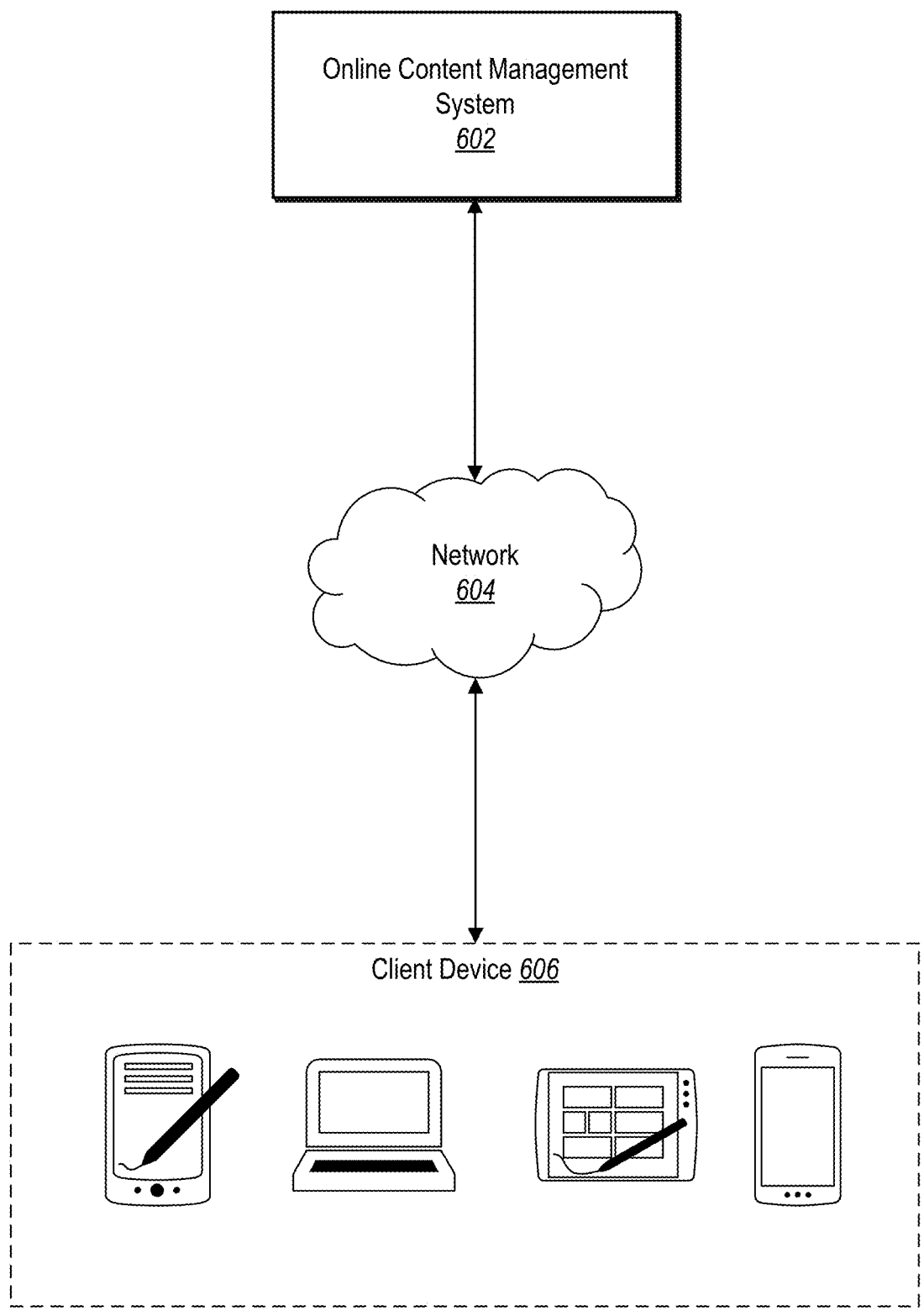
FIG. 6 illustrates a networking environment of an online content management system in accordance with one or more embodiments.

FIG. 6 is a schematic diagram illustrating an environment within which one or more embodiments of naming system 100 can be implemented. Online content management system 602 may generate, store, manage, receive, and send digital content (such as digital videos). For example, online content management system 602 may send and receive digital content to and from client devices 606 by way of network 604. In particular, online content management system 602 can store and manage a collection of digital content. Online content management system 602 can manage the sharing of digital content between computing devices associated with a plurality of users. For instance, online content management system 602 can facilitate a user sharing a digital content with another user of online content management system 602.

In particular, online content management system 602 can manage synchronizing digital content across multiple client devices 606 associated with one or more users. For example, a user may edit digital content using client device 606. The online content management system 602 can cause client device 606 to send the edited digital content to online content management system 602. Online content management system 602 then synchronizes the edited digital content on one or more additional computing devices.

In addition to synchronizing digital content across multiple devices, one or more embodiments of online content management system 602 can provide an efficient storage option for users that have large collections of digital content. For example, online content management system 602 can store a collection of digital content on online content management system 602, while the client device 606 only stores reduced-sized versions of the digital content. A user can navigate and browse the reduced-sized versions (e.g., a thumbnail of a digital image) of the digital content on client device 606. In particular, one way in which a user can experience digital content is to browse the reduced-sized versions of the digital content on client device 606.

Another way in which a user can experience digital content is to select a reduced-size version of digital content to request the full- or high-resolution version of digital content from online content management system 602. In particular, upon a user selecting a reduced-sized version of digital content, client device 606 sends a request to online content management system 602 requesting the digital content associated with the reduced-sized version of the digital content. Online content management system 602 can respond to the request by sending the digital content to client device 606. Client device 606, upon receiving the digital content, can then present the digital content to the user. In this way, a user can have access to large collections of digital content while minimizing the amount of resources used on client device 606.

Client device 606 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 606 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 604.

Network 604 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 606 may access online content management system 602.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
    training, based on characteristics of a plurality of previously named content items corresponding to a user account, a machine-learning model to identify a naming pattern associated with filenames of the plurality of previously named content items;
    determining, by at least one processor and using the machine-learning model, a plurality of name segment suggestions comprising name segments for setting a filename of a content item associated with the user account;
    providing, for display in a first portion of a graphical user interface, a plurality of graphical elements corresponding to the plurality of name segment suggestions for combining into the filename of the content item;
    receiving a selection of two or more graphical elements from the plurality of graphical elements to insert into a filename portion in a second portion of the graphical user interface, the filename portion comprising the two or more graphical elements in a first order of graphical elements based on positions of the two or more graphical elements;
    detecting, within the filename portion in the second portion of the graphical user interface, one or more inputs to select one or more graphical elements of the two or more graphical elements and modify a position of the one or more selected graphical elements within the filename portion to change the first order of graphical elements to a second order of graphical elements different than the first order of graphical elements; and
    combining two or more name segment suggestions corresponding to the two or more graphical elements into the filename of the content item according to the second order in which the two or more graphical elements are positioned based on the modified position of the one or more selected graphical elements.

2. The method as recited in claim 1, wherein determining the plurality of name segment suggestions for the content item comprises:
    determining one or more characteristics of the content item; and
    using the machine-learning model to determine the plurality of name segment suggestions based on the one or more characteristics of the content item.

3. The method as recited in claim 1, further comprising:
    preselecting one or more graphical elements from the plurality of graphical elements; and
    auto-populating the filename of the content item with one or more corresponding name segment suggestions.

4. The method as recited in claim 1, wherein detecting, within the filename portion in the second portion of the graphical user interface, the one or more inputs to select the one or more graphical elements of the two or more graphical elements and modify the position of the one or more selected graphical elements comprises detecting an input to drag a graphical element of the one or more selected graphical elements from a first position to a second position within the filename portion.

5. The method as recited in claim 4, wherein modifying the position of the one or more selected graphical elements comprises changing the first order graphical elements to the second order of graphical elements within the filename portion in response to the input to drag the graphical element from the first position to the second position.

6. The method as recited in claim 1, further comprising:
receiving a selection of an additional graphical element from the plurality of graphical elements; and
adding an additional name suggestion corresponding to the additional graphical element to the filename of the content item according to a position in which the additional graphical element is placed within the filename portion.

7. The method as recited in claim 1, further comprising:
providing, for display in the first portion of the graphical user interface, a first set of graphical elements corresponding to a first category of name segments and a second set of graphical elements corresponding to a second category of name segments, the first set of graphical elements separate from the second set of graphical elements; and
receiving selections of a first selected graphical element added to the filename of the content item corresponds to a name segment suggestion from the first category of name segments and a second selected graphical element added to the filename of the content item corresponds to a name segment suggestion from the second category of name segments.

8. The method as recited in claim 1, wherein:
determining the plurality of name segment suggestions for setting the filename of the content item associated with the user account comprises generating, using the machine-learning model, a plurality of scores for the plurality of name segment suggestions; and
providing the plurality of graphical elements corresponding to the plurality of name segment suggestions for setting the filename of the content item comprises selecting, for display in the graphical user interface and based on the plurality of scores for the plurality of name segment suggestions, the plurality of graphical elements.

9. The method as recited in claim 8, wherein selecting the plurality of graphical elements comprises selecting a predetermined number of graphical elements.

10. The method as recited in claim 8, wherein selecting the plurality of graphical elements comprises selecting graphical elements corresponding to name segment suggestions having scores that meet a predetermined threshold.

11. The method as recited in claim 1, further comprising training the machine-learning model to identify a naming pattern based on weights according to a hierarchy of a plurality of user accounts associated with a related group of users.

12. The method as recited in claim 1, further comprising:
detecting a text input comprising one or more manually entered characters within an input field associated with setting the filename of the content item; and
determining the plurality of name segment suggestions based on the text input and the naming pattern.

13. A system comprising:
at least one processor; and
a non-transitory computer readable storage medium comprising instructions that, when executed by the at least one processor, cause the system to:
identify characteristics of a plurality of previously named content items corresponding to a user account;
train, based on characteristics of the plurality of previously named content items corresponding to the user account, a machine-learning model to identify a naming pattern associated with filenames of the plurality of previously named content items;
determine, by the at least one processor and using the machine-learning model, a plurality of name segments for setting a filename of a new content item associated with the user account;
provide, for display in a first portion of a graphical user interface, a plurality of graphical elements corresponding to the plurality of name segments for combining into the filename of the new content item;
receive a selection of two or more graphical elements from the plurality of graphical elements to insert into a filename portion in a second portion of the graphical user interface, the filename portion comprising the two or more graphical elements in a first order of graphical elements based on positions of the two or more graphical elements;
detect, within the filename portion in the second portion of the graphical user interface, one or more inputs to select one or more graphical elements of the two or more graphical elements and modify a position of the one or more selected graphical elements within the filename portion to change the first order of graphical elements to a second order of graphical elements different than the first order of graphical elements; and
combine two or more name segments corresponding to the two or more graphical elements into the filename of the new content item according to the second order in which the two or more graphical elements are positioned based on the modified position of the one or more selected graphical elements.

14. The system as recited in claim 13, further comprising instructions that, when executed by the at least one processor, cause the system to determine the plurality of name segments for setting the filename of the new content item by:
determining a characteristic of the new content item; and
determining, using the identified naming pattern, the plurality of name segments according to the determined characteristic of the new content item.

15. The system as recited in claim 14, further comprising instructions that, when executed by the at least one processor, cause the system to determine the plurality of name segments according to the determined characteristic of the new content item by:
comparing the determined characteristic of the new content item to one or more characteristics of the plurality of previously named content items; and
selecting a name segment from a plurality of possible name segments based on a similarity of the characteristic of the new content item to the one or more characteristics of the plurality of previously named content items.

16. The system as recited in claim 13, further comprising instructions that, when executed by the at least one processor, cause the system to auto-populate, using the machine-learning model, the filename of the new content item with one or more name segments based on one or more characteristics of the new content item.

17. The system as recited in claim 16, further comprising instructions that, when executed by the at least one processor, cause the system to:
- provide, for display in the graphical user interface, an option to remove the one or more name segments auto-populating the filename of the new content item; and
- modify the filename of the new content item in response to a selection of the option to remove the one or more name segments from the filename of the new content item.

18. A non-transitory computer readable storage medium comprising instructions that, when executed by at least one processor, cause a computer system to:
- train, based on a plurality of content items previously stored in connection with a user account, a machine-learning model to identify a naming pattern associated with filenames of the plurality of content items;
- determine, by the at least one processor and using the machine-learning model, a plurality of name segment suggestions comprising name segments for setting a filename of a content item associated with the user account;
- provide, for display in a first portion of a graphical user interface, a plurality of graphical elements corresponding to the plurality of name segment suggestions for combining into the filename of the content item;
- receive a selection of a two or more graphical elements from the plurality of graphical elements to insert into a filename portion in a second portion of the graphical user interface, the filename portion comprising the two or more graphical elements in a first order of graphical elements based on positions of the two or more graphical elements;
- detect, within the filename portion in the second portion of the graphical user interface, one or more inputs to select one or more graphical elements of the two or more graphical elements and modify a position of the one or more selected graphical elements within the filename portion to change the first order of graphical elements to a second order of graphical elements different than the first order of graphical elements; and
- combine two or more name segment suggestions corresponding to two or more graphical elements into the filename of the content item according to the order in which the two or more graphical elements are positioned based on the modified position of the one or more selected graphical elements.

19. The non-transitory computer readable storage medium of claim 18, further comprising instructions that, when executed by the at least one processor, cause the computer system to:
- determine the plurality of name segment suggestions for the content item by generating, using the machine-learning model, a plurality of scores for the plurality of name segment suggestions; and
- provide the plurality of graphical elements corresponding to the plurality of name segment suggestions for setting the filename of the content item by selecting, for display in the graphical user interface and based on the plurality of scores for the plurality of name segment suggestions, a plurality of graphical elements.

20. The non-transitory computer readable storage medium of claim 18, further comprising instructions that, when executed by the at least one processor, cause the computer system to train, based on a plurality of content items for a plurality of related user accounts, a machine-learning model to identify a naming pattern associated with the plurality of related user accounts.

* * * * *